United States Patent
Cotton et al.

(10) Patent No.: US 6,929,765 B2
(45) Date of Patent: Aug. 16, 2005

(54) METHOD OF MANUFACTURING A SPACER OF AN ELECTRICALLY DRIVEN WATER PURIFICATION APPARATUS

(75) Inventors: Bill Cotton, Grafton (CA); Glenn Towe, Caledon Village (CA); Mathew J. Yagar, Waterloo (CA); Eduard Erbiceanu, Toronto (CA)

(73) Assignee: E-Cell Corporation, Guelph (CA)

( * ) Notice: Subject to any disclaimer, the term of this patent is extended or adjusted under 35 U.S.C. 154(b) by 633 days.

(21) Appl. No.: 09/847,297

(22) Filed: May 3, 2001

(65) Prior Publication Data

US 2002/0163101 A1 Nov. 7, 2002

Related U.S. Application Data

(63) Continuation-in-part of application No. 09/327,598, filed on Jun. 8, 1999, now Pat. No. 6,235,166.

(30) Foreign Application Priority Data

Jul. 30, 1999 (CA) ............................................. 2279201

(51) Int. Cl.[7] .......................... B29C 45/14; B29C 70/70
(52) U.S. Cl. ....................... 264/267; 264/259; 264/273; 264/275
(58) Field of Search ............................. 264/267, 271.1, 264/273, 274, 275, 254, 251, 252, 259; 204/263, 638, 639

(56) References Cited

U.S. PATENT DOCUMENTS

| | | | |
|---|---|---|---|
| 2,609,570 A | * | 9/1952 | Danielson et al. .......... 264/274 |
| 3,030,435 A | | 4/1962 | Andrews |
| 3,223,612 A | | 12/1965 | Chen et al. |
| 3,866,926 A | | 2/1975 | Traum |
| 3,872,280 A | * | 3/1975 | Van Dalen .................. 392/390 |
| 3,873,656 A | | 3/1975 | Garner |
| 4,545,585 A | | 10/1985 | Buse |
| 4,673,613 A | * | 6/1987 | Ward ....................... 428/301.1 |
| 4,751,153 A | | 6/1988 | Roth |
| 4,770,756 A | | 9/1988 | Crawlfield et al. |

(Continued)

FOREIGN PATENT DOCUMENTS

| | | |
|---|---|---|
| DE | 4003812 | 8/1990 |
| JP | 6-1058159 | 3/1986 |

*Primary Examiner*—Angela Ortiz
(74) *Attorney, Agent, or Firm*—Mark Sajewycz; Gowling Lafleur; Henderson LLP

(57) ABSTRACT

An electrically driven membrane process apparatus is provided comprising a first spacer having a perimeter having a surface with an inner peripheral edge defining an opening, and a recess formed on the inner peripheral edge, and an ion exchange membrane having an outer edge fitted within the recess. The spacer can further comprise a plurality of bosses and an ion exchange membrane having a corresponding plurality of apertures for receiving the bosses. The spacer can include a plastic mesh consisting essentially of polypropylene or polyethylene, and a perimeter surrounding the plastic mesh, the perimeter comprising material selected from the group consisting of thermoplastic vulcanizates and thermoplastic elastomeric olefins. The spacer can have an upstanding seal member depending therefrom, received by groove within a corresponding frame member. A second spacer is also provided having a continuous flange depending from its surface and surrounding a throughbore, for pinching a portion of the first spacer. A method of injection molding a thin plastic part comprising a perimeter having an inner peripheral edge and a mesh joined to the inner peripheral edge is also provided including the steps of (a) providing first and second mold halves, each of the mold halves having an interior surface and a continuous ridge depending therefrom; and (b) pinching opposite side of the mesh between the ridges to form a flow barrier.

15 Claims, 11 Drawing Sheets

U.S. PATENT DOCUMENTS

| | | | |
|---|---|---|---|
| 4,784,741 A | | 11/1988 | Boulton et al. |
| 4,792,425 A | * | 12/1988 | Weaver ...................... 264/252 |
| 4,839,122 A | | 6/1989 | Weaver |
| 4,872,888 A | | 10/1989 | Ehrfeld et al. |
| 4,881,313 A | * | 11/1989 | Artinyan et al. ......... 29/896.62 |
| 4,892,632 A | | 1/1990 | Morris |
| 4,894,128 A | | 1/1990 | Beaver |
| 4,898,653 A | | 2/1990 | Morris |
| 4,902,420 A | | 2/1990 | Pall et al. |
| 4,915,803 A | | 4/1990 | Morris |
| 4,940,518 A | | 7/1990 | Morris |
| 5,076,924 A | | 12/1991 | Persson et al. |
| 5,234,652 A | | 8/1993 | Woodhams et al. |
| 5,236,205 A | | 8/1993 | Chen et al. |
| 5,267,740 A | | 12/1993 | Stritzke |
| 5,284,718 A | | 2/1994 | Chow et al. |
| 5,295,698 A | | 3/1994 | Agarwal et al. |
| 5,417,906 A | * | 5/1995 | Chiodo ........................ 264/153 |
| 5,464,700 A | | 11/1995 | Steck et al. |
| 5,551,706 A | | 9/1996 | Barna et al. |
| 5,676,894 A | * | 10/1997 | Specht ...................... 264/46.4 |
| 5,681,048 A | | 10/1997 | Tronel |
| 5,681,438 A | | 10/1997 | Proulx |
| 5,688,460 A | * | 11/1997 | Ruschke ..................... 264/263 |
| 5,700,017 A | | 12/1997 | Tensor |
| 5,766,472 A | * | 6/1998 | Tzakis ........................ 210/485 |
| 5,804,762 A | | 9/1998 | Jones et al. |
| 5,824,217 A | | 10/1998 | Pearl et al. |
| 5,891,337 A | * | 4/1999 | Keller et al. ................ 210/443 |
| 5,902,956 A | | 5/1999 | Spies et al. |

* cited by examiner

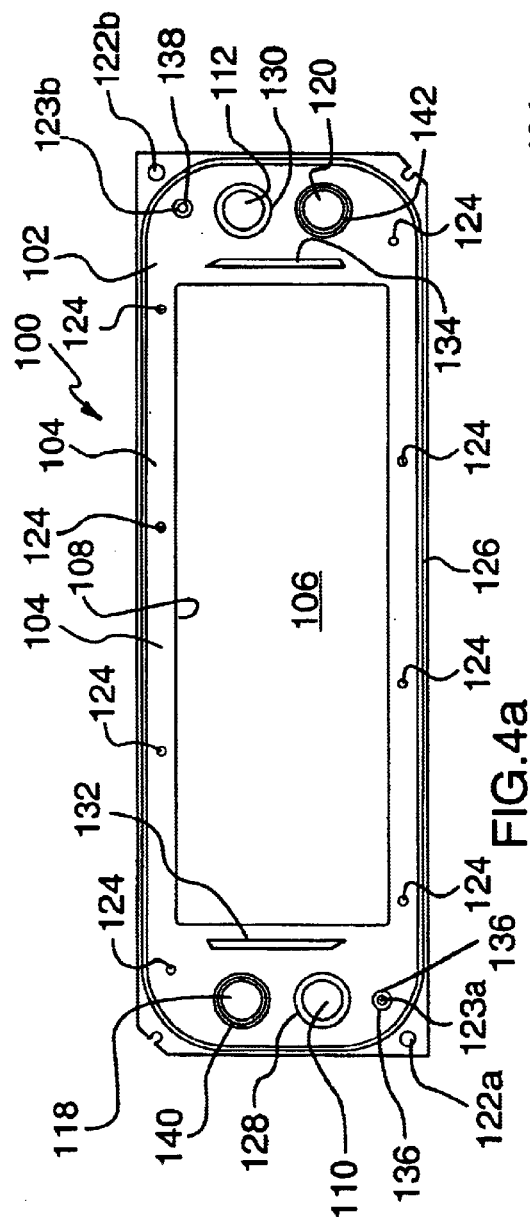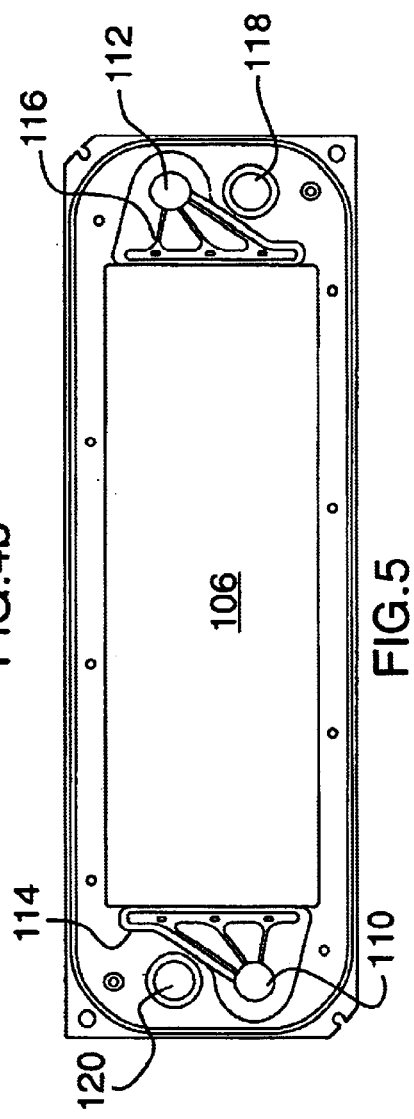

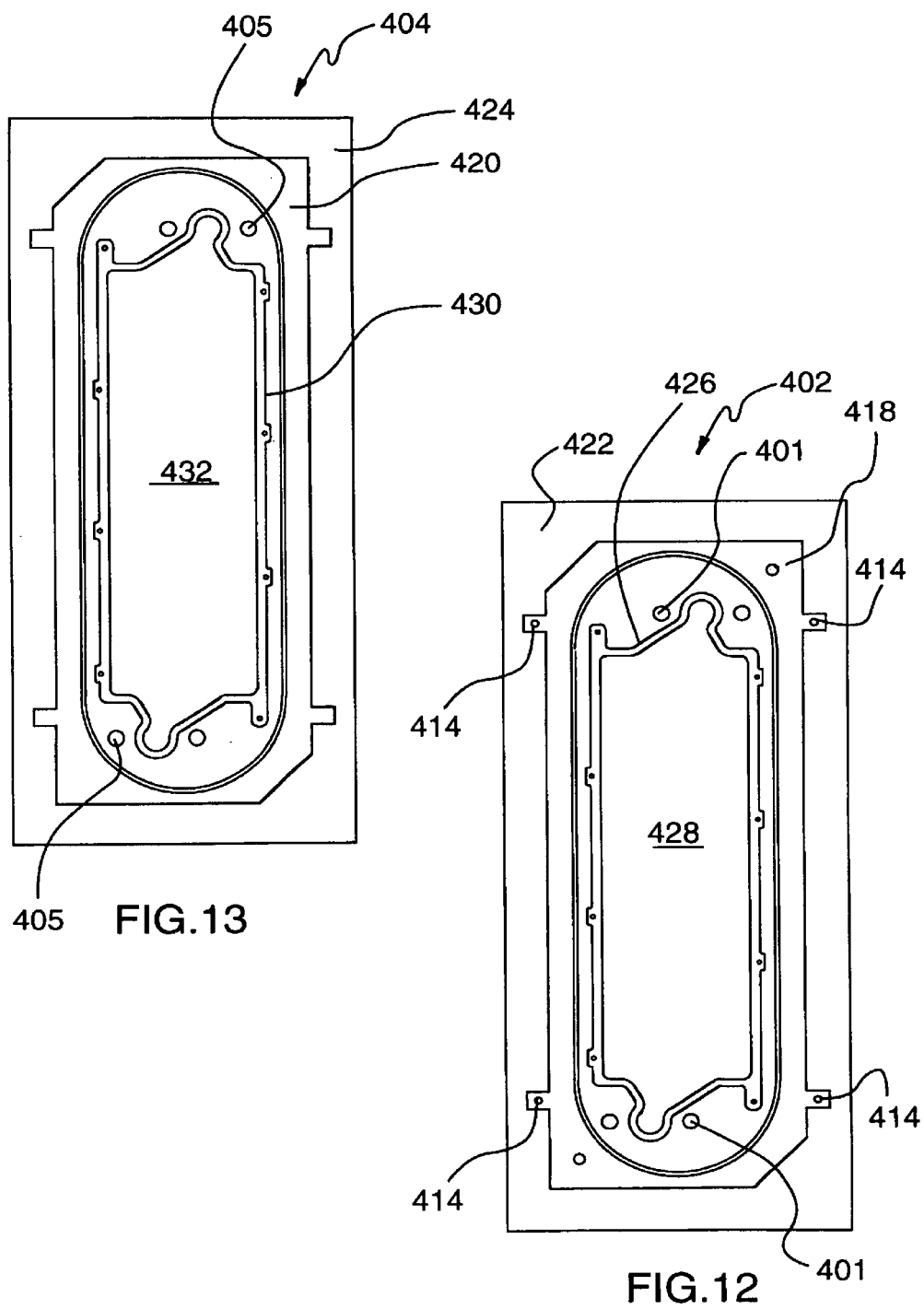

METHOD OF MANUFACTURING A SPACER OF AN ELECTRICALLY DRIVEN WATER PURIFICATION APPARATUS

RELATED APPLICATIONS

This application is a continuation-in-part of application Ser. No. 09/327,598 filed Jun. 8, 1999 now issued as U.S. Pat. No. 6,235,166, and also claims the benefit of PCT/CA00/00687 filed Jun. 8, 2000.

FIELD OF THE INVENTION

The present invention relates to electrically driven water purification devices and, in particular, to novel sealing means to facilitate sealing of such devices.

DESCRIPTION OF THE RELATED ART

Water purification devices of the filter press type which purify water by electrically driven membrane processes, such as electrodyalisis or electrodeionization, comprise individual chambers bounded by ion exchange membranes. Typically, each of the chambers is defined on one side by a membrane disposed to the preferential permeation of dissolved cation species (cation exchange membrane) and on an opposite side by a membrane disposed to the preferential permeation of dissolved anion species (anion exchange membrane).

Water to be purified enters one chamber commonly referred to as a diluting chamber. By passing a current through the device, electrically charged species in the diluting chamber migrate towards and through the ion exchange membranes into adjacent chambers commonly known as concentrating chambers. As a result of these mechanisms, water exiting the diluting chamber is substantially demineralized. Electrically charged species which permeate through the ion exchange membranes and into a concentrating chamber are flushed from the concentrating chamber by a separate aqueous stream flowing through the concentrating chamber.

To this end, the above-described devices comprise alternating diluting and concentrating chambers. In addition, cathode and anode chambers, housing a cathode and an anode respectively therein, are provided at the extreme ends of such devices, thereby providing the necessary current to effect purification of water flowing through the diluting chamber.

For maintaining separation of associated cation and anion exchange membranes, spacers are provided between the alternating cation and anion exchange membranes of the above-described water purification devices. Therefore, each of the diluting chambers and concentrating chambers of a typical electrically-driven water purification device comprise spacers sandwiched between alternating cation and anion exchange membranes.

To prevent any appreciable leakage from diluting chambers and concentrating chambers of such devices, the above-described arrangement of spacers sandwiched between ion exchange membranes must form a substantially water-tight seal. To this end, the spacers and the ion exchange membranes are pressed together and fixed in position with known connectors. Unfortunately, this alone has not provided adequate sealing characteristics.

Various attempts have been made to improve the sealing characteristics of electrically driven water purification devices. For instance, it is known to use an adhesive to bond the ion exchange membranes to either side of a spacer. Unfortunately, as a result of exposure to typical operating conditions, the seal formed thereby is prone to leakage, thereby causing the loss of valuable product water. This arises from the intrinsic moisture permeability of the IX membranes and because of poor mechanical sealing characteristics.

Alternatively, it is known to provide spacers having resilient o-ring type sealing members on either side of the spacer for engaging an opposing planar surface of adjacent spacers. A cation exchange membrane and an anion exchange membrane are pressed against opposite sides of the spacer and function as permselective barriers. In this arrangement, the spacer, its o-ring type sealing member, and ion exchange membranes define a space wherein ionic species in aqueous fluid media contained therein can migrate in a direction substantially orthogonal to the plane of the spacer and permeate through either of the ion exchange membranes. Unfortunately, during assembly of the device, it is known to be difficult to maintain ion exchange membranes in a desired alignment relative to associated spacers. Further, during operation and consequent exposure to relatively high internal pressure or differential pressures within the device, ion exchange membranes may move and become displaced from a desired position relative to their associated spacers. Failure to maintain such a desired position may compromise the sealing of the associated chamber.

In an attempt to limit movement of ion exchange membranes during assembly of the water purification device, ion exchange membranes have been provided with alignment holes which receive fixed rod-like structures. However, this provides a further potential source for leakage and, therefore, compromises sealing of the device.

The material of construction of known spacers is also known to be detrimental to the sealing characteristics of this arrangement. To facilitate mass production by injection moulding, spacers are typically manufactured from thermoplastic materials, such as polypropylene. Unfortunately, such thermoplastic materials are prone to stress relaxation or compression set. As a result, over time, because of exposure to the relatively high internal pressures, such spacers, and particularly their o-ring type sealing members, lose their resiliency, thereby compromising their ability to maintain adequate seals with adjacent surfaces.

SUMMARY OF THE INVENTION

According to one aspect, the present invention provides an electrically driven membrane process apparatus comprising a first spacer having a perimeter having a surface with an inner peripheral edge defining an opening, and a recess formed on the inner peripheral edge, and an ion exchange membrane having an outer edge fitted within the recess. The recess can be continuous along the inner peripheral edge. The ion exchange membrane can have a top surface wherein the top surface is vertically disposed no lower than the surface of the perimeter when the ion exchange membrane is fitted in the recess. The spacer can be comprised of material selected from the group consisting of thermoplastic vulcanizates, thermoplastic elastomeric olefins and fluoropolymers. The spacer can be a concentrating chamber spacer (C-spacer) or a diluting chamber spacer (D-spacer).

In another aspect, the present invention provides an electrically driven membrane process apparatus comprising a spacer with a plurality of bosses and an ion exchange membrane having a corresponding plurality of apertures for receiving the bosses. The spacer can further comprise a perimeter having a surface with an inner peripheral edge defining an opening, and a recess formed on the inner peripheral edge for fitting an ion exchange membrane, wherein the bosses extend from the recess substantially perpendicular thereto.

In yet another aspect, the present invention provides a spacer of an electrically driven membrane process apparatus comprising a plastic mesh consisting essentially of polypropylene or polyethylene, and a perimeter surrounding the plastic mesh, the perimeter comprising material selected from the group consisting of thermoplastic vulcanizates and thermoplastic elastomeric olefins.

In a further aspect, the present invention provides an electrically driven water purification apparatus having a first spacer and a frame member separated by an ion exchange membrane, the first spacer having an upstanding seal member depending therefrom and the frame member having a groove for receiving the seal member. The seal member can be an o-ring or a sealing bead. The frame member can be a second spacer, or cathode or anode end frames.

In another aspect, the present invention provides an electrically driven membrane process apparatus having a first spacer and a frame member separated by an ion exchange membrane, the first spacer comprising a first surface having a first throughbore for flowing an aqueous liquid, the frame member comprising a second surface, a second throughbore extending through the second surface and communicating with the first throughbore, and a continuous flange depending from the second surface and surrounding the second throughbore, the flange pinching a portion of the first surface surrounding the first throughbore. The second throughbore can facilitate D-flow.

In a further aspect, the present invention provides an electrically driven membrane process apparatus comprising an electrically driven membrane process apparatus comprising a first spacer having a first perimeter having a surface with a first inner peripheral edge defining a first opening, a recess formed on the first inner peripheral edge, and a mesh extending across the first opening and joined to the first inner peripheral edge, a second spacer having a second perimeter having a surface with a second inner peripheral edge defining a second opening, an ion exchange membrane fitted within the recess and extending across the first opening and having a surface portion engaged to the second perimeter inwardly of the first inner peripheral edge, and a ridge depending from the second perimeter of the second spacer and compressing the surface portion of the ion exchange membrane against the mesh, thereby preventing or reducing likelihood of buckling of the mesh.

In yet another aspect, the present invention provides a method of injection molding a thin plastic part comprising a perimeter having an inner peripheral edge and a mesh joined to said inner peripheral edge, including the steps of (a) providing a mold having a cavity and a core, the cavity having a first interior surface and a first continuous ridge depending from the first interior surface, the core having a second interior surface and a second continuous ridge depending from the second interior surface; and (b) pinching opposite side of the mesh between the ridges to form a flow barrier. The cavity can further include hanging pins depending from the first interior surface. In this respect, the method would then further include, after step (a) and before step (b), the step of suspending the mesh from the hanging pins.

BRIEF DESCRIPTION OF DRAWINGS

The present invention will be better understood with reference to the appended drawings in which:

FIG. 4a is a plan view of one side of a D-spacer of the present invention;

FIG. 4b is an elevation view of the D-spacer shown in FIG. 4a;

FIG. 5 is a plan view of one side of a D-spacer of the present invention, partly in section, illustrating flow channels formed therein;

FIG. 12 is a plan view of the interior side of the cavity plate of the mold shown in FIG. 11;

FIG. 13 is a plan view of the interior side of the core plate of the mold shown in FIG. 11;

DETAILED DESCRIPTION OF THE PREFERRED EMBODIMENT

The present invention provides a spacer of a filter press type electrically driven water purification apparatus, such as an electrodyalisis unit or an electrodeionization unit. Electrodeionization units include those with ion exchange resin in the concentrating chamber. The spacer of the present invention can also be used in other electrically driven membrane process apparati of the filter press type. An example of another electrically driven membrane process which falls within the purview of this invention is salt splitting. The invention will hereafter be explained with reference to an electrically driven water purification apparatus.

Figure 1:
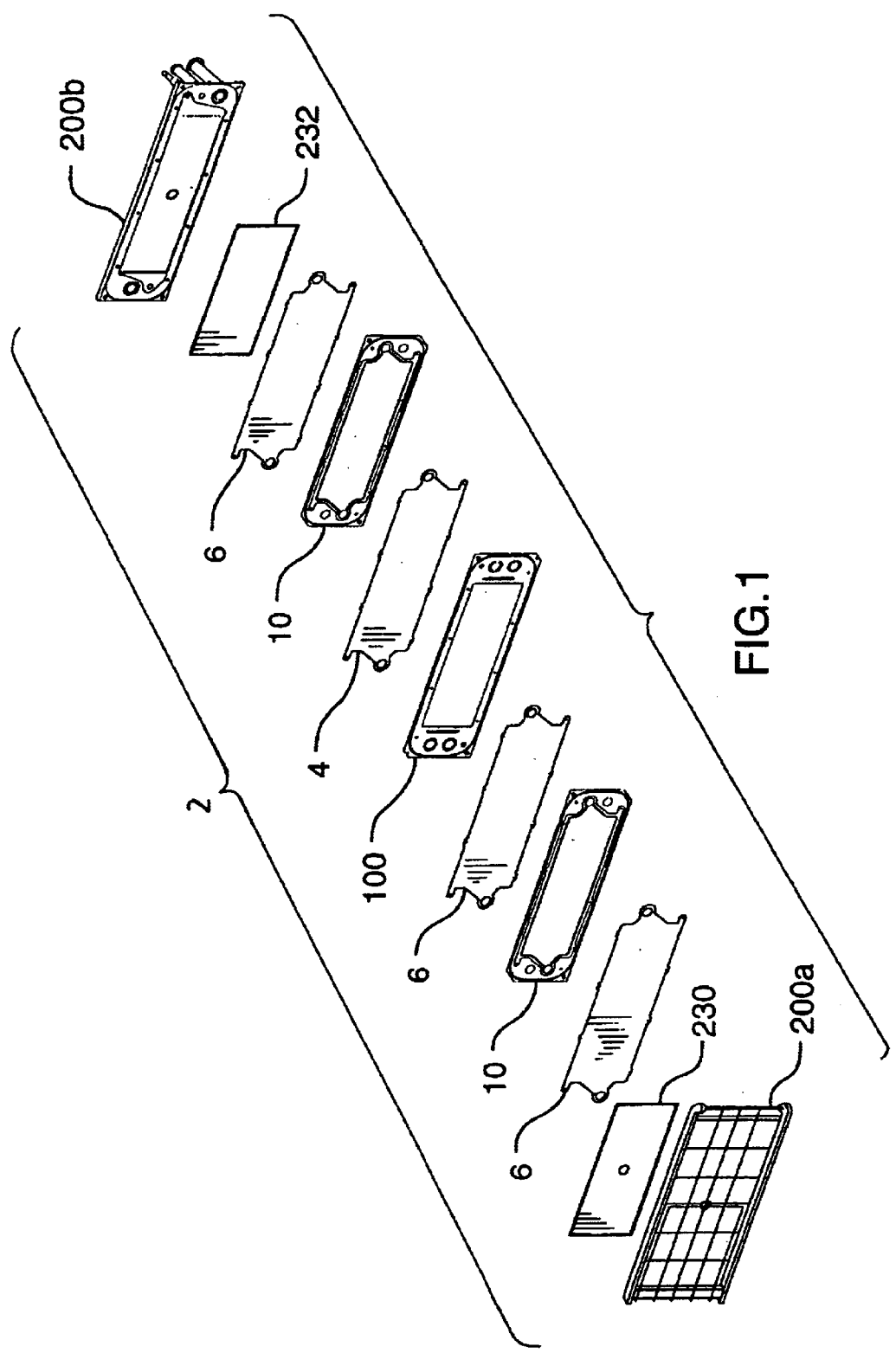
FIG. 1 is an exploded perspective view of an electrically driven water purification unit of the present invention.

Referring to FIG. 1, a typical electrically driven water purification apparatus 2 comprises alternating anion exchange membranes 4 and cation exchange membranes 6. Spacers 10 and 100 are provided in between the alternating cation and anion exchange membranes to help define alternating diluting chambers ("D-chambers") and concentrating chambers ("C-chambers"). Electrode chambers, namely a cathode chamber with a cathode 230 and an anode chamber with an anode 232, are provided at terminal ends of the unit, and are each bound on one side by a spacer 10 and on an opposite side by an end plate 200a or 200b. To assemble the water purification apparatus, each of the anion exchange membranes, cation exchange membranes, and associated spacers and end plates 200a and 200b are forced together to create a substantially fluid tight arrangement.

Different spacers are provided for each of the D-chambers and C-chambers. In this respect, the D-chamber spacer, or "D-spacer", helps define the D-chamber. Similarly, the C-chamber spacer, or "C-spacer", helps define the C-chamber.

Figure 2A:
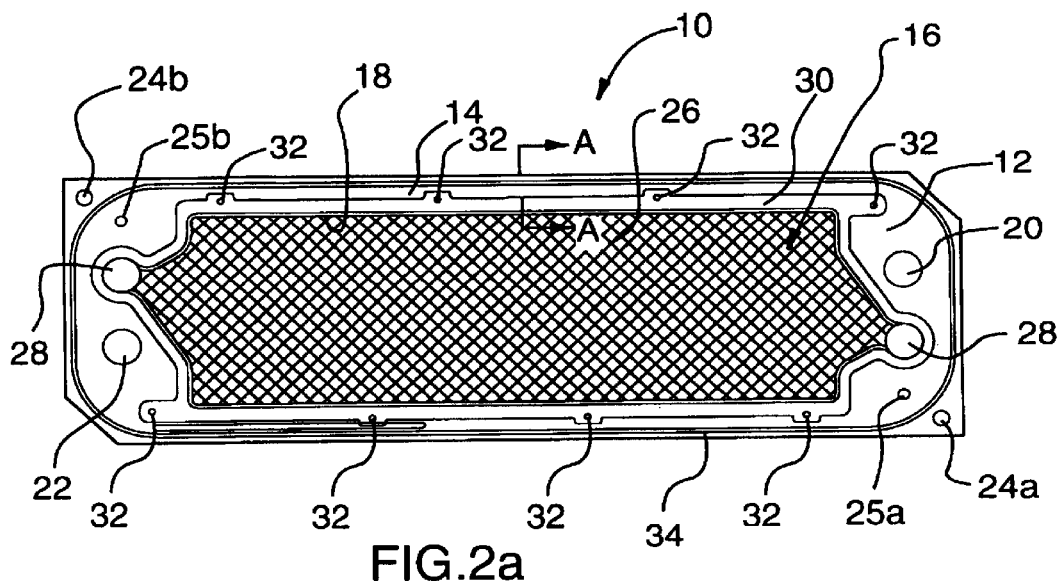
FIG. 2a is a plan view of one side of a C-spacer of the present invention.
Figure 2B:
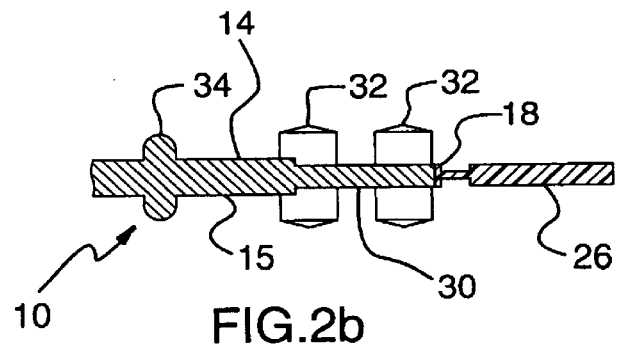
FIG. 2b is a sectional elevation view of the C-spacer of FIG. 2a taken along lines A—A.

Referring to FIGS. 2a and 2b, the C-spacer 10 comprises a continuous perimeter 12 of thin, substantially flat elastomeric material, having a first side surface 14 and an opposite second side surface 15, and defining an opening 16. In this respect, the C-spacer has a picture frame-type configuration. The C-spacer 10 is comprised of a material which is not prone to significant stress relaxation while able to withstand typical operating conditions in an electrically driven water purification unit. In particular, the C-spacer material should possess acceptable electrical insulation properties and be chemically resistant to high and low pH levels. In this respect, an example of suitable materials include thermoplastic vulcanizates, thermoplastic elastomeric olefines, and fluoropolymers. The C-spacer 10 can be manufactured by injection moulding or compression moulding.

Figure 3:
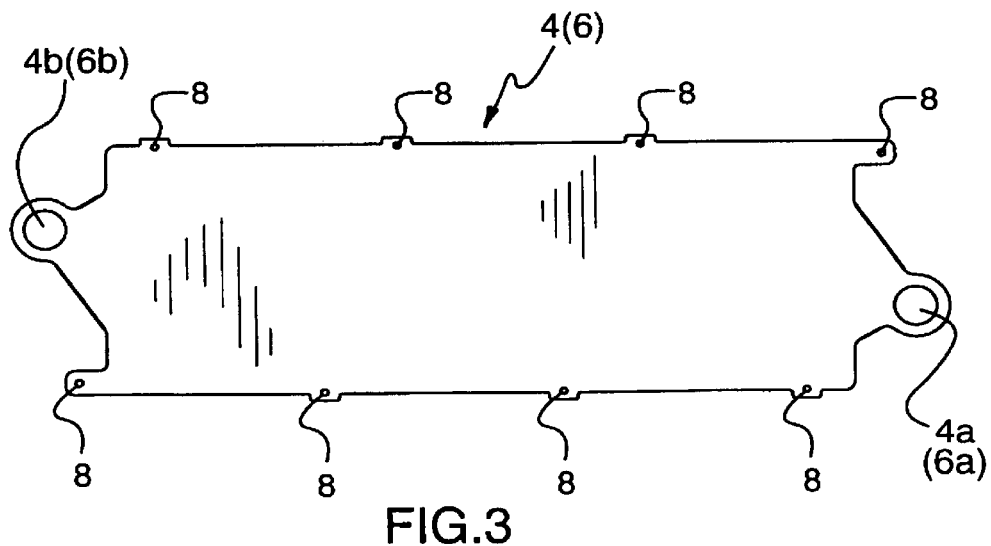
FIG. 3 is a perspective view of an ion exchange membrane of the present invention.
Figure 6:
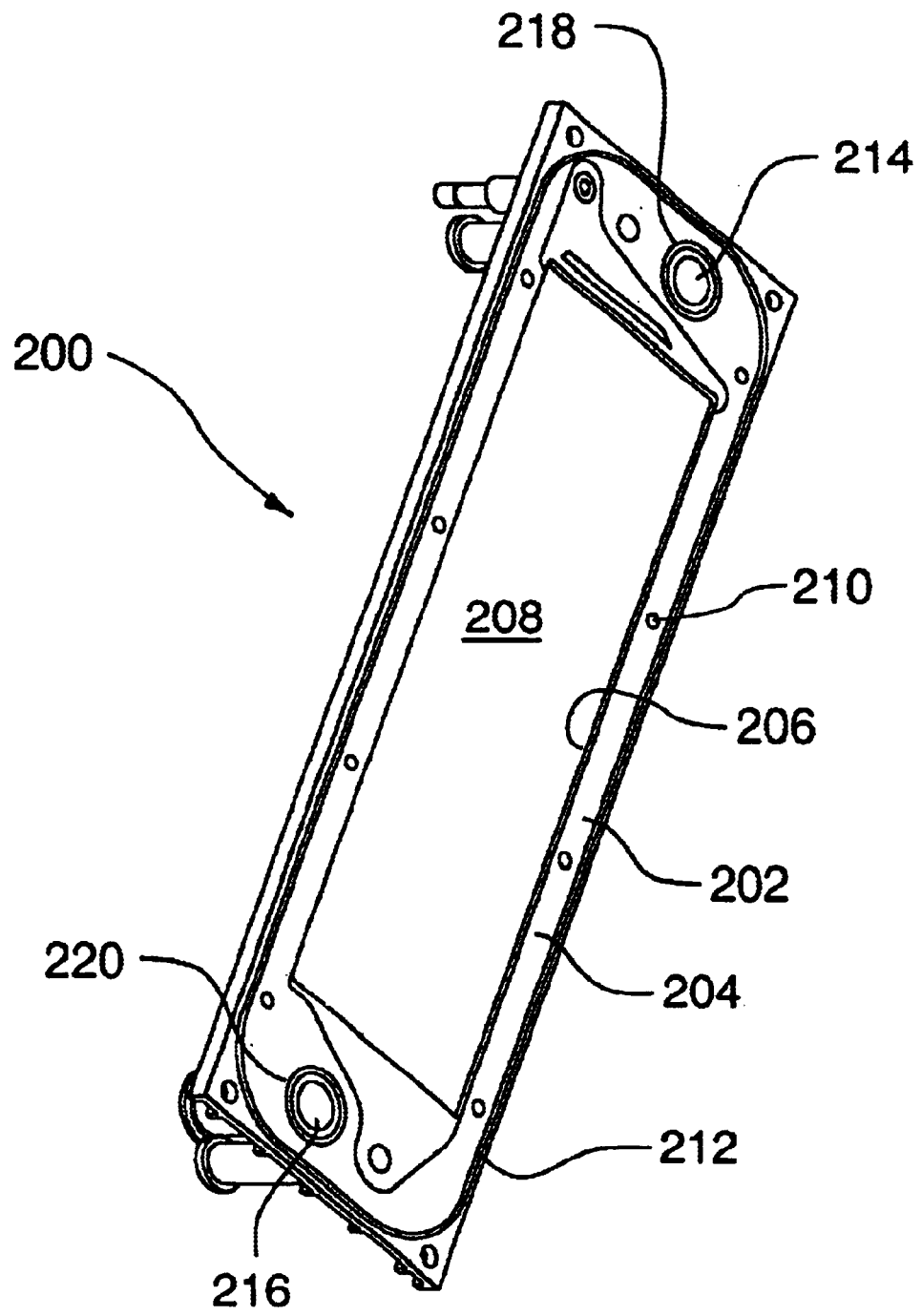
FIG. 6 is a plan view of one side of an anode end frame of the present invention.

The first side surface 14 can be pressed against an ion exchange membrane, such as a cation exchange membrane 6. Similarly, the opposite second side surface 15 can be pressed against a second ion exchange membrane, such as an anion exchange membrane 4. In one embodiment, the ion exchange membrane associated with a side surface of the C-spacer 10 is also associated with a side surface of the D-spacer 100 (see FIG. 4) in the manner described below. FIG. 3 shows one side surface of an ion exchange membrane 4 or 6, and it is understood that the features of one side surface are the same as those of the opposite side surface. Further, FIG. 3 is representative of either an anion exchange membrane 4 or a cation exchange membrane of the present invention. In another embodiment, the ion exchange membrane associated with a side surface of the C-spacer 10 is also associated with a side surface of an electrode end plate 200 (see FIG. 6), such as a cathode end plate or an anode end plate (anode end plate is shown in FIG. 6), in the manner described below.

Notably, pressing first and second ion exchange membranes against the first and second sides of the C-spacer 10 forms a C-chamber. The inner peripheral edge 18 of the C-spacer 10 perimeter helps define a space 16 which functions as a fluid passage for aqueous liquid flowing through the C-chamber.

First and second spaced-apart throughbores are provided in the C-chamber to facilitate flow in and out of the C-chamber. In one embodiment, first and second throughbores can be formed in one or both of the first and second ion exchange membranes (see FIG. 3) to facilitate flow in and out of the C-chamber. In this respect, flow is introduced in the C-chamber via the first throughbore 4a or 6a and is discharged from the C-chamber via the second throughbore 4b or 6b (supply flow to and discharge flow from C-chamber hereinafter referred to as "C-flow").

It is understood that other arrangements could also be provided to effect flow in and out of the C-chamber. For instance, the C-spacer perimeter 12 could be formed with throughbores and channels wherein the channels facilitate fluid communication between the throughbores and the C-chamber. In this respect, aqueous liquid could be supplied via an inlet throughbore in the C-spacer perimeter, flow through a first set of channels formed in the C-spacer perimeter into the C-chamber, and then leave the C-chamber through a second set of channels formed in the C-spacer perimeter which combine to facilitate discharge via an outlet throughbore formed in the C-spacer perimeter.

A first throughbore 20 and a second throughbore 22 extend through the surface of the C-spacer perimeter. The first throughbore 20 provides a fluid passage for purified water discharging from the D-chambers, the second throughbore 22 provides a fluid passage for water to be purified supplied to the D-chambers (supply flow to and discharge flow from D-chamber hereinafter referred to as "D-flow"). As will be described below, means are provided to isolate C-flow from D-flow.

Throughgoing holes 24, 25a and 25b are also provided in the perimeter of the C-spacer 10. Holes 24a, 24b are adapted to receive alignment rods which assists in aligning the D-spacer when assembly the water purification apparatus. Holes 25a and 25b are adapted to flow aqueous liquid discharging from the anode and cathode chambers.

In one embodiment, the C-spacer 10 can further comprise a plastic screen or mesh 26 joined to the inner peripheral edge 18 of the perimeter 12 and extending through the space 16 defined by the inner peripheral edge 18 of the perimeter 12. The mesh 26 can be made integral with or encapsulated on the inner peripheral edge 18 of the perimeter 12. The mesh 26 further assists in spacing the anion exchange membrane from the cation exchange membrane. The mesh 26 can be a bi-planar, non-woven high flow mesh. Alternatively, the mesh 26 can be woven. Suitable materials include polypropylene and polyethylene. It is understood that, where ion exchange resin is provided in the concentrating chamber, no mesh would be required as the resin itself would provide a spacing function.

In one embodiment, mesh 26 comprises three co-planar layers of polypropylene mesh wherein the first and third layers have a thickness of $20/1000$ of an inch and are characterized by 16 strands per inch, and the second layer, interposed between the first and third layers, has a thickness of $30/1000$ of an inch and is characterized by 15 strands per inch. Preferably, the first and third layers of mesh are thinner and characterized by a tighter weave than the second layer. In this way, desirable hydraulic characteristics can be achieved (as the water flows primarily across the middle second layer) while the thinner outer layers with the tighter weaver provide desired support to the membrane. In another embodiment, the second layer is characterized by a different colour or shading than the first and third layers to permit easier identification and differentiation between the second and the first and third layers, thereby facilitating assembly.

Where the C-spacer 10 includes mesh 26 for spacing anion exchange membranes from cation exchange membranes, the mesh 26 must be comprised of material which are stable at high temperatures and chemically resistant to high and low pH environments. The material comprising the perimeter 12 must also be compatible with the material comprising mesh 26 in regard to the manufacture of a unitary component comprising both the perimeter 12 and mesh 26. In this respect, to facilitate melt processing of the C-spacer 10, the perimeter 12 is preferably comprised of material which is melt processible at temperatures which would not cause degradation of the mesh. In this respect, where the mesh is comprised of polypropylene or polyethylene, acceptable materials include thermoplastic vulcanizates and thermoplastic elastomeric olefines.

In the embodiment illustrated in FIG. 2, discontinuities or gaps 28 may be provided between the mesh 26 and the perimeter 12 wherein such discontinuities 28 correspond with the first and second throughbores of an ion exchange membrane. Such discontinuities 28 provide visual assistance in properly aligning the ion exchange membrane in relation to the C-spacer 10 during assembly of the water purification unit.

A side surface of the C-spacer further has a recess 30 formed therein which is adapted for fitting an ion exchange membrane. When the ion exchange membrane is fitted in the recess 30, the exposed surface of the ion exchange membrane is planar with the surface of the perimeter 12 or slightly raised above the surface of the perimeter 12. In one embodiment, a continuous recess 30 is provided along the inner peripheral edge 18 of the perimeter 12 and on both the first and second side surfaces of the perimeter 12. During assembly of the water purification apparatus, the outer edge of ion exchange membrane is fitted in the recess 30 on the first side of the perimeter 12 and a cation exchange membrane is positioned in the recess 30 on the second side of the perimeter 12. The recesses 30 are sized to facilitate a relatively tight fitting arrangement between the ion exchange membranes and the perimeter and the ion exchange membranes and the mesh, once the ion exchange membranes and C-spacer 10 are forced together and once the ion exchange membranes become hydrated and swell.

A side surface of the C-spacer 10 further includes a plurality of bosses 32 which can be fitted within corresponding apertures 8 of an ion exchange membrane. Corresponding apertures can be provided in a D-spacer 100 or an electrode end plate 200 to receive insertion of the bosses 32. In one embodiment, the bosses 32 extend along the inner peripheral edge 18 of the perimeter 12 on both the first and second side surfaces of the perimeter 12. More preferably, the bosses 32 extend from the surfaces of the recessed portions 30 substantially perpendicular thereto. During assembly of the water purification apparatus, the bosses 32 on the first side of the perimeter 12 are matched with corresponding mating apertures 8 in the anion exchange membrane 4 and the D-spacer 100 or electrode end plate 200. The apertures 8 of the anion exchange membrane 4 and a first D-spacer 100 are then fitted over the corresponding bosses 32. Similarly, the bosses 32 on the second side of the perimeter 12 are matched with corresponding apertures 8 in the cation exchange membrane 6 and a second D-spacer 100 or an electrode end plate 200. The apertures of the cation exchange membrane 6 and the second D-spacer 100 or electrode end plate 200 are then fitted over the corresponding bosses 32. The apertures 8 of the ion exchange membranes 4 or 6 are sized to be tightly fitted over the bosses 32. In one embodiment, the apertures 8 are sized to be no greater than approximately 75% of the diameter of the bosses 32.

Figure 15:
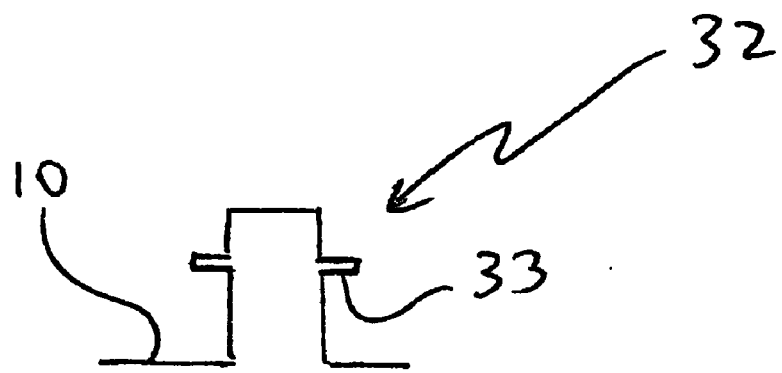
FIG. 15 is an illustration of an embodiment of a boss of a C-spacer.
Figure 16:
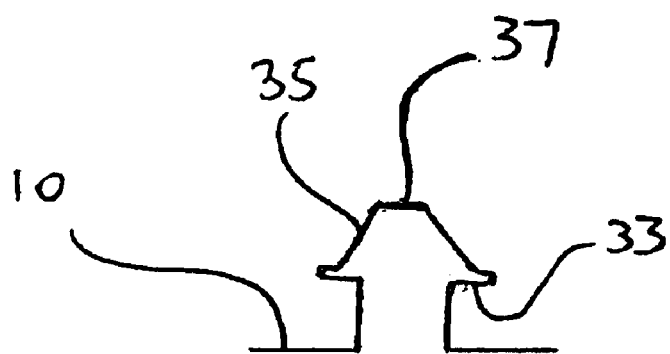
FIG. 16 is an illustration of another embodiment of a boss of a C-spacer.

Referring to FIGS. 15 and 16, in one embodiment, the bosses 32 include a radially extending undercut 33. Further, sidewall surface 35 of the bosses 32 can be tapered or flared outwardly from top surface 37 towards undercut 33, to facilitate insertion of bosses 32 through apertures 8 in membranes 4 or 6.

An upstanding secondary seal member 34 is also provided on a side surface of the C-spacer 10 for fitting within a first corresponding groove of a D-spacer 100 or electrode end plate 200. In one embodiment, the secondary seal member 34 is a continuous O-ring or bead extending from and integral with the surface of the C-spacer. The secondary seal member 34 depends from the surface of the perimeter 12. In one embodiment, secondary seal members 34 are provided on both the first and second side surfaces of the perimeter 12. The secondary seal member 34 on the first side surface and the secondary seal member 34 on the second side surface each fit within grooves of a first D-spacer 100 and a second D-spacer 100 or electrode end plate 200 respectively. During assembly of the water purification apparatus, the secondary seal members 34 are fitted or inserted into the grooves of the D-spacers 100 and electrode end plates 200.

Figure 17:
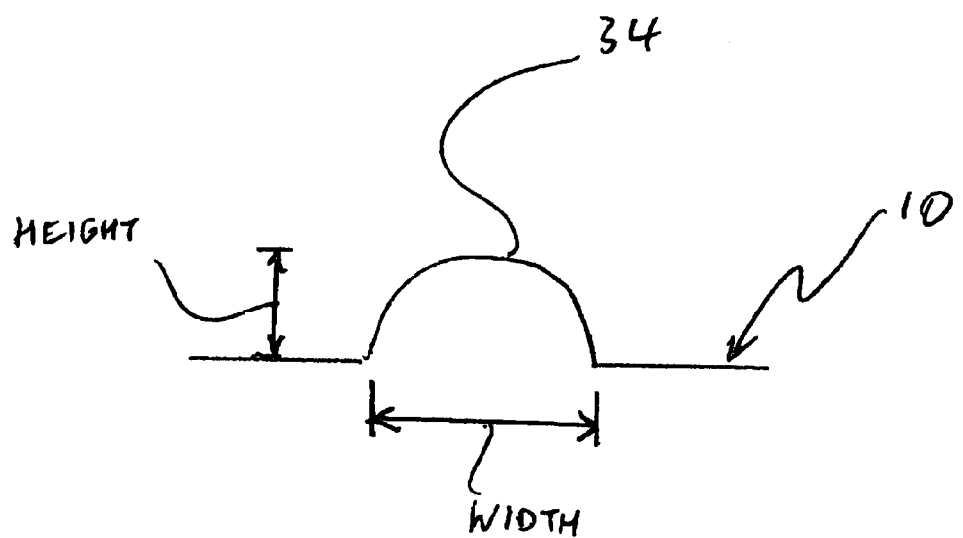
FIG. 17 is an illustration of an embodiment of a secondary seal member of a C-spacer.

Referring to FIG. 17, in one embodiment, secondary seal member 34 is characterized by a ratio of width:height of about 3:2. In another embodiment, the ratio of width:height is from about 1.25:1 to 2:1.

Referring to FIGS. 4a and 4b, the D-spacer 100 comprises a continuous perimeter 102 of a thin plastic material, having a first side surface 104 and an opposite second side surface 105 and defining an opening 106. In order to complement the sealing features provided on the above-described embodiment of the C-spacer 10, and therefore improves sealing of both the C-chamber and the D-chamber, the D-spacer 100 is made of harder material than the C-spacer 10. Suitable materials for the D-spacer 100 include polyethylene and polypropylene.

The first side surface of the D-spacer 100 can be pressed against an ion exchange membrane, such as a cation exchange membrane 6. Similarly, the second side surface of the D-spacer 100 can be pressed against a second ion exchange membrane, such as an anion exchange membrane 4. In one embodiment, one of the ion exchange membranes associated with a side surface of the D-spacer 100 is also associated with a side surface of the C-spacer 10 in the manner above-described.

Notably, pressing first and second ion exchange membranes against the first and second side surfaces of the D-spacer 100 forms a D-chamber 101. The inner peripheral edge 108 of the D-spacer perimeter 102 helps define a space which functions as a fluid passage for aqueous liquid flowing through the D-chamber 101.

A first throughbore 110 and a second throughbore 112 are formed in the D-spacer and define fluid passages for the respective supply and discharge of aqueous liquid in the D-chamber. The positions of the first throughbore 110 and second throughbore 112 of the D-spacer 100 correspond to those of the first throughbore 20 and second throughbore 22 of the C-spacer 10 respectively when the water purification apparatus is assembled. In this respect, the first throughbore 110 and second throughbore 112 of the D-spacer 100 communicate with the first throughbore 20 and second throughbore 22 of the C-spacer 10 respectively. In operation, aqueous liquid is supplied from the first throughbore 110 of the D-spacer 100, flows through the D-chamber and becomes purified, and is then discharged via the second throughbore 112 of the D-spacer 100.

In one embodiment, the first and second throughbores 110 and 112 of the D-spacer 100 are formed in the perimeter 102 of the D-spacer 100. To facilitate flow of water to be purified into the D-chamber via the first throughbore 110, a first plurality of channels 114 are formed through the perimeter 102 and provides for communication between the first throughbore 110 and the D-chamber. Similarly, a second plurality of channels 116 are formed through the perimeter 102 and provides for communication between the second throughbore 112 and the D-chamber, thereby facilitating discharge of purified water from the D-chamber.

Although the D-spacer 100 has been described as being provided with first and second throughbores 110 and 112, each associated with a plurality of channels 114 and 116, to effect fluid flow into and out of the D-chamber, it is understood that other means may be provided to supply and discharge aqueous liquid in and out of the D-chamber. For instance, water to be purified may be introduced directly into the D-chamber via the a first throughbore formed in an ion exchange membrane. Similarly, purified water may be discharged directly out of the D-chamber via a second throughbore formed in an ion exchange membrane. In this respect, flows in and out of the D-chamber would be channelled in a manner similar to that above-described for the C-chamber.

A third throughbore 118 extends through the surface of the D-spacer perimeter 102 and provides a fluid passage for aqueous liquid discharging from a C-chamber. Further, a fourth throughbore 120 extends through the surface of the D-spacer perimeter for supplying aqueous liquid to a C-chamber. The positions of the third throughbore 118 and fourth throughbore 120 of the D-spacer perimeter communicate with first and second throughbores respectively formed in a C-chamber for facilitating flow in and out of such C-chamber. In the embodiment illustrated in FIG. 3, the third and fourth throughbores 118 and 120 of the D-spacer perimeter 102 communicate with first and second throughbores respectively formed in an ion exchange membrane pressed against a C-spacer perimeter 112. In operation, aqueous liquid is supplied to a C-chamber via the third throughbore 118 of the D-spacer perimeter 102 and the first throughbore in the ion exchange membrane. Such aqueous liquid then flows through such C-chamber, becomes loaded with ionic species migrating through the ion exchange membranes pressed against the C-spacer 10, and is discharged from the C-chamber via the second throughbore in the ion exchange membrane and the fourth throughbore in the D-spacer perimeter 102.

Throughgoing holes 122a, 122b, 123a, and 123b are also provided in the perimeter of the D-spacer 100. Holes 122a and 122b are adapted to receive alignment rod which assists in aligning the D-spacer 100 when assembling the water purification unit. Holes 123a and 123b are adapted to flow aqueous liquid discharging from the anode and cathode chambers.

As discussed above, a side surface of the D-spacer 100 is provided with apertures 124 to receive insertion of bosses 32 associated with the C-spacer 10. Further, a groove 126 is also provided in a side surface of the D-spacer perimeter 102 to receive insertion of the secondary sealing member 34. In one embodiment, the apertures 124 and the groove 126 is provided on both the first and second side surfaces of the D-spacer perimeter 102.

A first flange 128 and a second flange 130 can depend from a side surface of the perimeter 102 of the D-spacer 100 and surround the first throughbore 110 and second throughgoing bore 112 of the D-spacer 100 respectively. When the water purification apparatus is assembled, the first flange 128 engages and pinches a portion of the C-spacer perimeter 12 surrounding the first throughgoing bore 20 of the C-spacer 10. Similarly, the second flange 130 engages and pinches a portion of the C-spacer 10 surrounding the second throughgoing bore 22 of the C-spacer perimeter 12. In one embodiment, first and second flanges 128 and 130 are provided on both side surfaces of the D-spacer 100 to engage and pinch adjacent C-spacers 10 on each side of the D-spacer 100.

A first upstanding shallow ridge 132 and a second upstanding shallow ridge 134 can be provided extending from a side surface of the perimeter 102 of the D-spacer 100. The first and second upstanding shallow ridges 132 and 134 are provided to prevent or reduce ingress of aqueous liquid from the D-chamber 101 and into the third and fourth throughbores 118 and 120 of the D-spacer 100. Aqueous liquid in the D-chamber 101 may leak into any of the third and fourth throughbores 118 and 120 if the ion exchange membrane adjacent to the D-spacer 100 disengages from the D-spacer perimeter 102, thereby creating a flow path for liquid in D-chamber 101 to flow into any of the third or fourth throughbores 118 and 120, thereby providing a risk for mixing of D-flow with C-flow. To reduce the likelihood that the ion exchange membrane becomes disengaged from the D-spacer perimeter 102, one or more upstanding shallow ridges can be strategically provided on the D-spacer perimeter 102 (two upstanding shallow ridges 132 and 134 are provided in the embodiment illustrated in FIG. 4) to engage and compress a side surface of ion exchange membrane against the C-spacer mesh 26 when the unit is assembled, thereby providing a more effective seal between the ion exchange membrane and the D-spacer 100.

More particularly, the upstanding shallow ridges 132 and 134 are positioned on the D-spacer perimeter 102 to compress a portion of the first side surface of ion exchange membrane at a location opposite to that of the location of the second side surface portion which is not seated against the C-spacer perimeter 12 but which is engaged to D-spacer perimeter 102 (hereinafter, surface portion). Further, the upstanding shallow ridges must necessarily compress that part of surface portion which is disposed between throughbore of ion exchange membrane and the inner peripheral edge of the D-spacer perimeter 102. When the unit is assembled, portions of the second side surface of ion exchange membrane are firmly pressed against C-spacer perimeter 12, and particularly against the recess portion 30 of the C-spacer perimeter 12, by virtue of contact between the first side surface of ion exchange membrane and a side surface of the D-spacer perimeter 102. Those portions of the ion exchange membrane which are not firmly pressed against the C-spacer perimeter recess 30 are disposed against the C-spacer mesh 26. Because the mesh 26 is subject to buckling or other deformation, the ion exchange membrane disposed against the mesh 26 is more likely to disengage from the surface of the D-spacer perimeter 102 than that portion of the ion exchange material pressed against the recess 30. Where this disengagement occurs at the inner peripheral edge of the D-spacer perimeter 102, and continues along the D-spacer perimeter surface to either of throughbores 118 or 120, fluid communication is established between D-chamber 101 and throughbores 118 and 120, creating a potential for mixing of D-flow and C-flow. By positioning upstanding shallow ridges 132 and 134 as above-described, buckling of mesh 26 is prevented or reduced, and the risk that this flowpath becomes established is mitigated. Preferably, the upstanding shallow ridge traverses the entire surface portion between opposite edges of ion exchange membrane.

In one embodiment, upstanding shallow ridges 132 and 134 are provided on both the first and second sides of the D-spacer perimeter 102 at positions as above-described.

In this way, ion exchange membranes are compressed against both sides of the C-spacer mesh 26, thereby resisting buckling of the C-spacer mesh 26.

Flanges 136 and 138 are also provided and extend from a side surface of the D-spacer perimeter 102 and surround holes 123a and 123b. Similarly, flanges 140 and 142 are also provided extending from the D-spacer perimeter 102 about throughbore 118 and 120. When the water purification device is assembled, flanges 126, 128, 140 and 142 engage and pinch a portion of C-spacer 10. In this manner, flanges 126 and 128 prevent or reduces the mixing of D-flow with C-flow in the event that ion exchange membrane disengages from D-spacer perimeter 102 surface, as above-described, thereby providing a flow path from the D-chamber 101. On the other hand, flanges 140 and 142 facilitate better sealing of flanges 128 and 130 against C-spacer perimeter 12. Without flanges 140 and 142, the sealing features about throughbores 110 and 118 or 112 and 120 may not be perfectly vertically aligned, which could compress sealing of these throughbores.

Where the water purification apparatus is an electrodeionization unit, ion exchange resin is provided in the D-chamber and positioned between the anion and cation exchange membranes provided on either side of the D-spacer 100. Alternatively, where no ion exchange resin is required, such as in the case of an electrodyalisis unit, a mesh can be provided in much the same manner as provided in the above-described C-spacer 10, for purposes of spacing ion exchange membranes disposed on either side of the D-spacer 100.

It is understood that the above-described embodiments of a D-spacer 100 could be used as C-spacers 10 in electrically driven water purification units. Similarly, the above-described embodiments of a C-spacer 10 could be used as D-spacers 100 in such units.

Referring to FIG. 6, an electrode end plate 200, such as a cathode end plate 200a or an anode end plate 200b, (an anode end plate 200b), comprises a hard, solid plastic material, having a first side surface 202 and an opposing second side surface (not shown). The first side surface 200 comprises a perimeter 204 having an inner peripheral edge 206 which defines an interior recessed portion 208. The second side surface can be substantially planar. In order to complement the sealing features provided on the above-described embodiment of the C-spacer 10, and therefore improves sealing of the C-chamber and the electrode chamber, the electrode end plate 200 is made of harder material than the C-spacer 10. Suitable materials for the electrode end plate 200 include polyethylene and polypropylene.

The first side surface 202 can be pressed against an ion exchange membrane, such as a cation exchange membrane 6 or an anion exchange membrane 4. In one embodiment, the ion exchange membrane pressed against the first side surface 202 is also pressed against a side surface of a C-spacer 10. Notably, pressing an ion exchange membrane against the first side surface of the electrode end plate 200 forms an electrode chamber, such as a cathode chamber or an anode chamber.

As discussed above, and in likewise manner with the D-spacers 100 of the first side surface 202 of the electrode end plate 200 is provided with apertures 210 to receive insertion of bosses 32 associated with C-spacer 10. Further, a groove 212 is also provided in the first side surface of the electrode end plate 200 to receive insertion of the secondary sealing member 34.

Where throughgoing bores 214 and 216 are provided in the electrode end plate to facilitate D-flow, as is the case in the electrode end plate 200 illustrated in FIG. 6, a first flange 218 and a second flange 220 can extend from the first side surface 202 of the perimeter 204 of the electrode end plate 200 and surround the throughgoing bores 214 and 216 of the electrode end plate 200. When the water purification apparatus is assembled, the first flange 218 engages and pinches a portion of the C-spacer 10 perimeter surrounding the first throughgoing bore 20 of the C-spacer 10. Similarly, the second flange 220 engages and pinches a portion of the C-spacer 10 surrounding the second throughgoing bore 22 of the C-spacer perimeter 12. This serves to prevent or reduce mixing of D-flow with C-flow.

Figure 7:
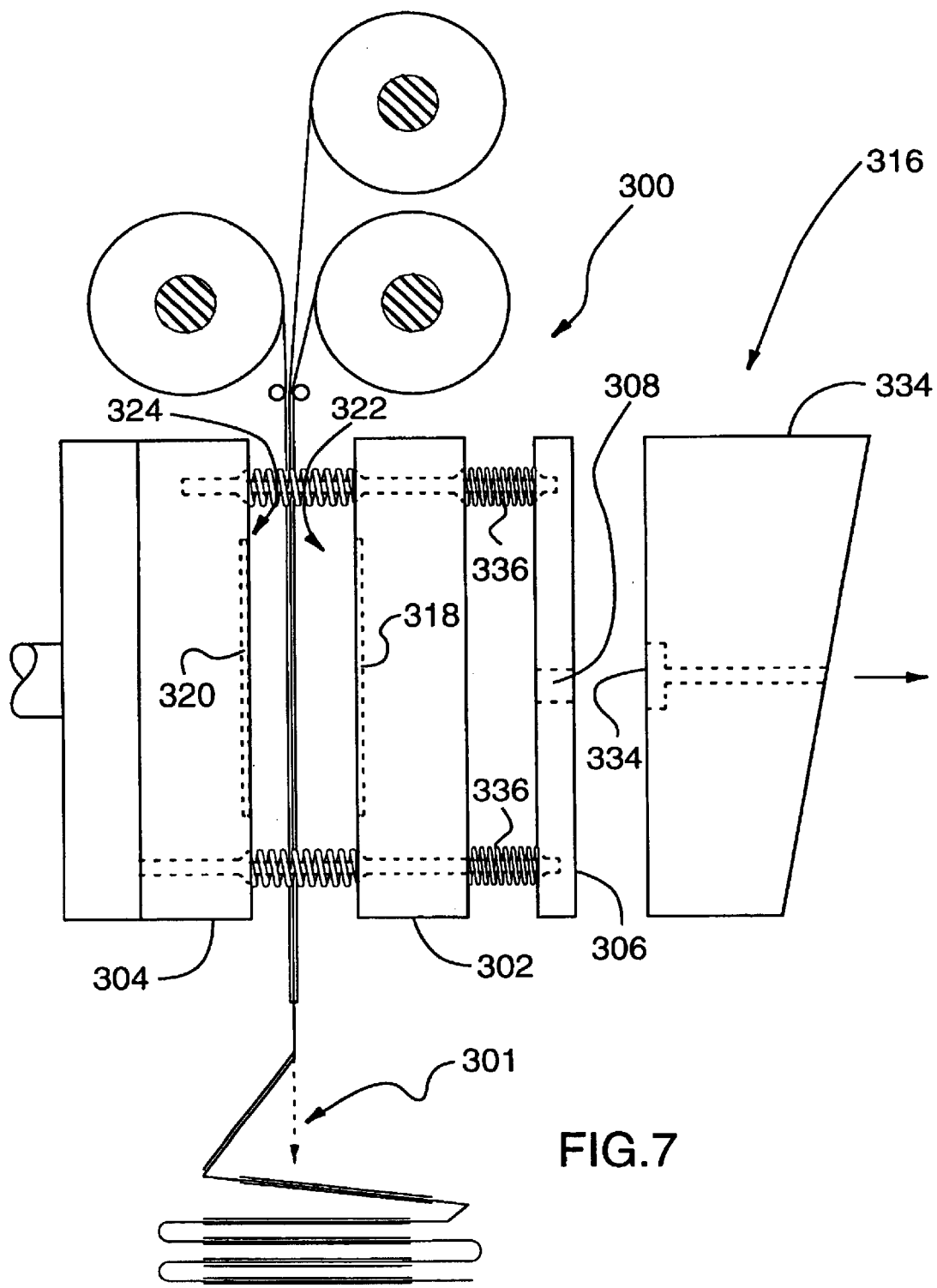
FIG. 7 is an illustration of an unclamped mold having mesh interposed between its cavity and core plates for purposes of injection molding.
Figure 8:
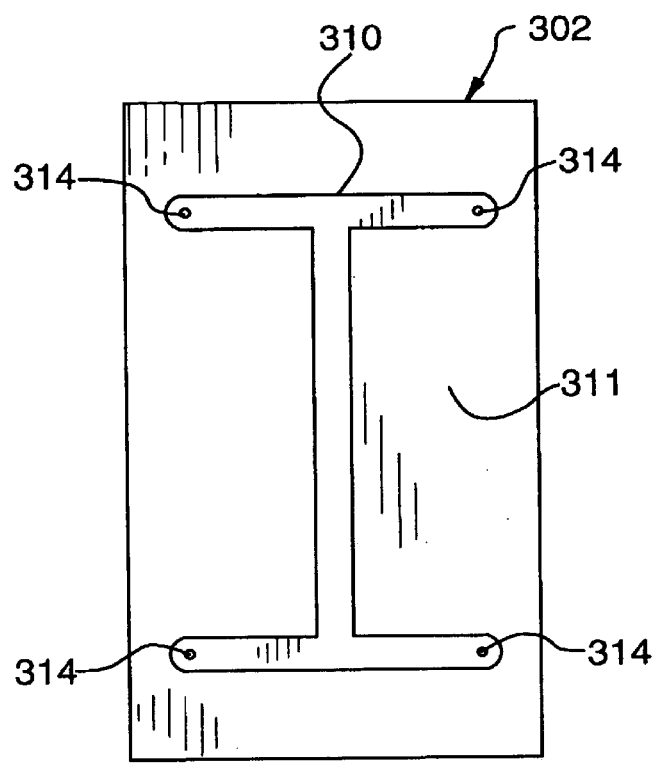
FIG. 8 is a plan view of the exterior side of the cavity plate of the mold shown in FIG. 7.
Figure 14:
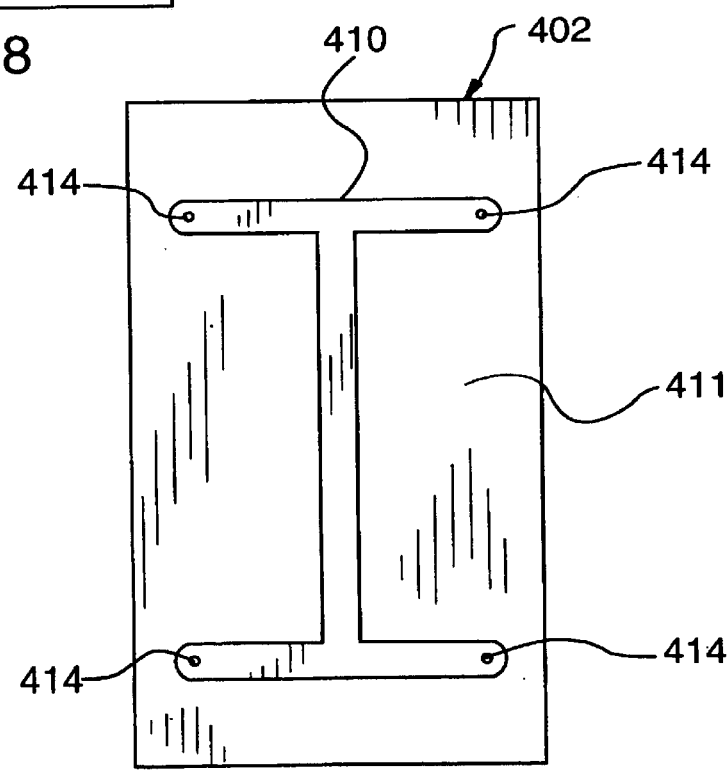
FIG. 14 is a plan view of the exterior side of the cavity plate of the mold shown in FIG. 11.
Figures 9, 10:
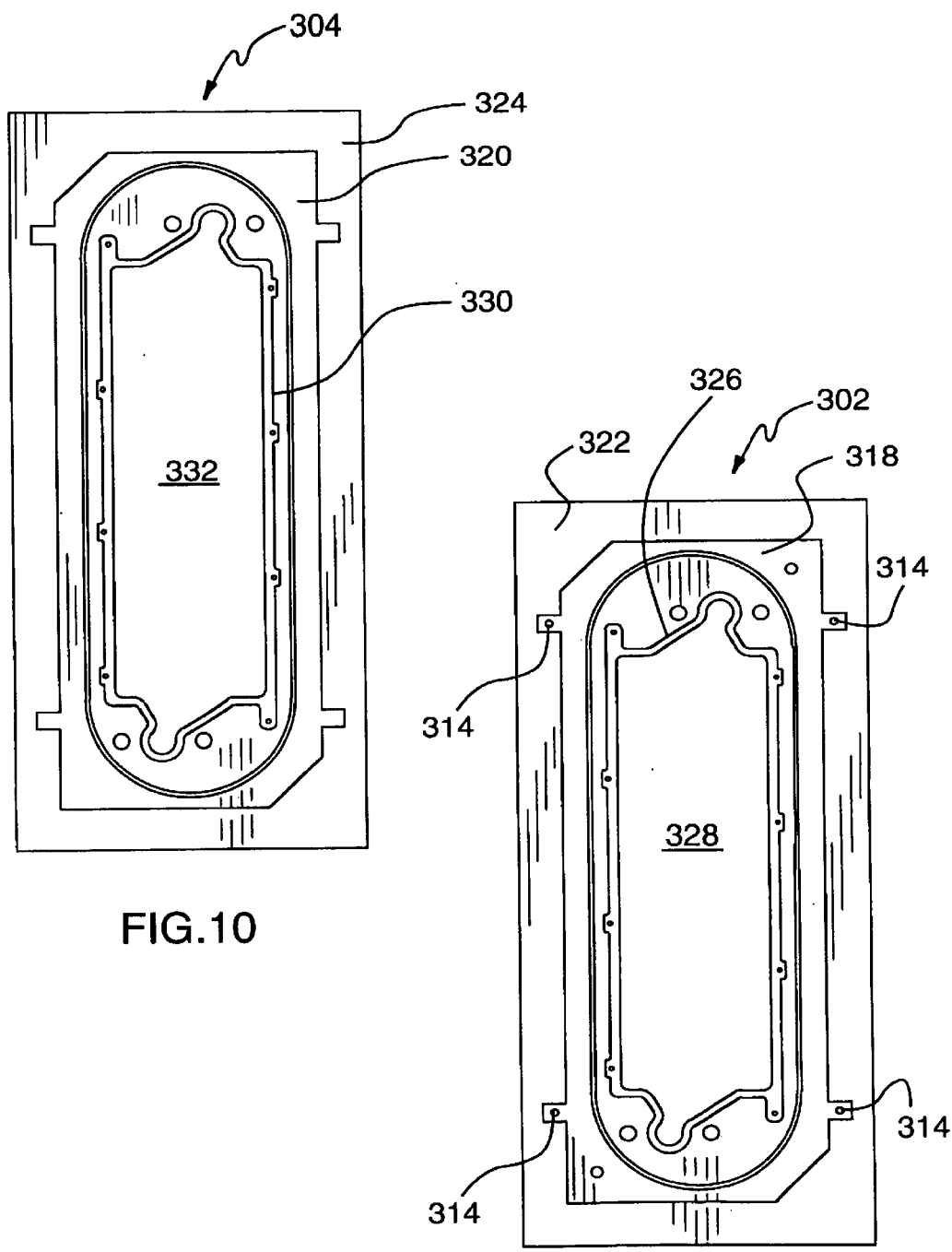
FIG. 9 is a plan view of the interior side of the cavity plate of the mold shown in FIG. 7.
FIG. 10 is a plan view of the interior side of the core plate of the mold shown in FIG. 7.
Figure 11:
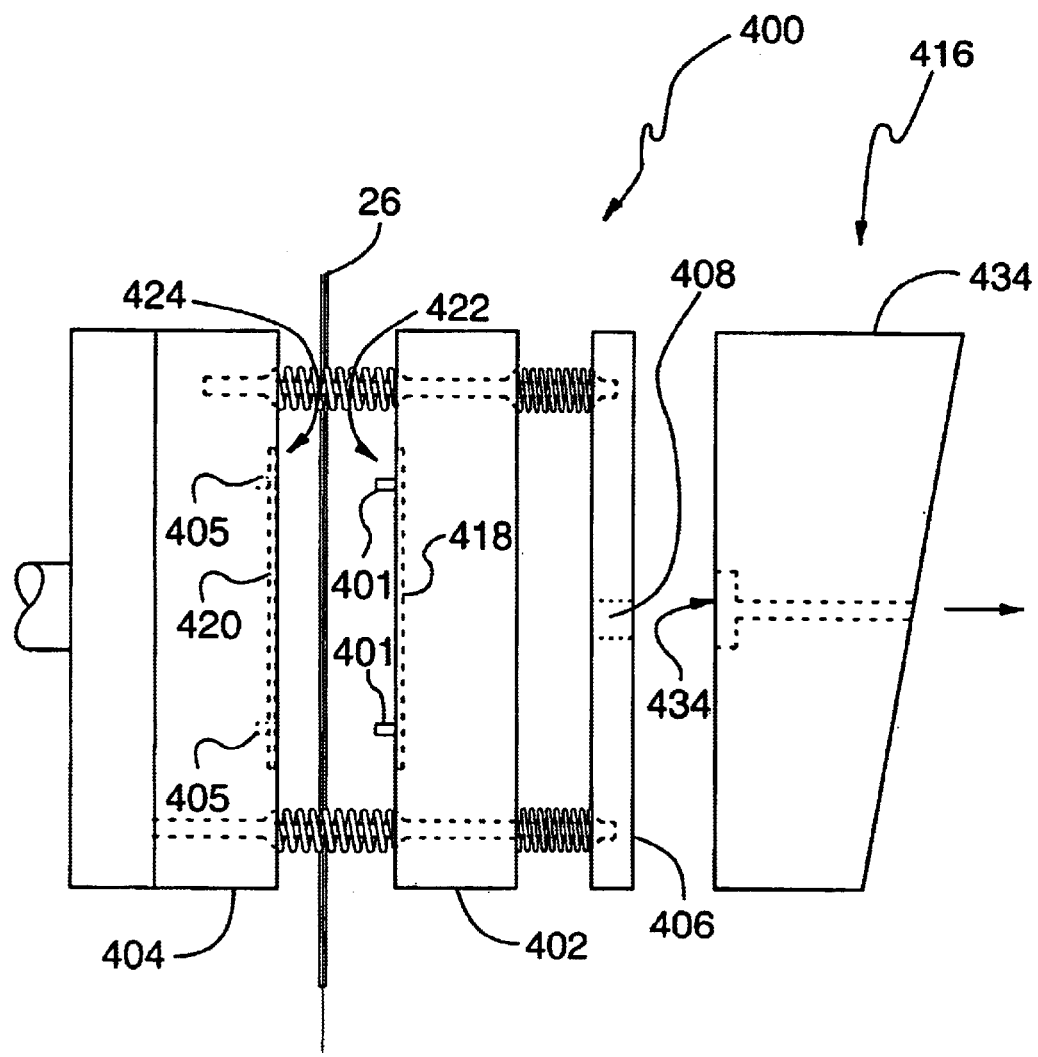
FIG. 11 is an illustration of a second unclamped mold having mesh interposed between its cavity and core plates for purposes of injection molding a spacer of the present invention.

Referring to FIG. 2, the embodiment of the spacer illustrated therein can be manufactured by injection moulding. Where the perimeter 12 is comprised of a high temperature melt processible plastic such as a thermoplastic vulcanizate, the perimeter is preferably overmolded on the mesh by injection molding.

Where the C-spacer 10 is formed by overmolding mesh 26 with perimeter 12, the mesh 26 is first formed by conventional methods and then interposed between cavity plate 302 and core plate 304 of mold 300. Referring to FIG. 7, while interposed between plates 302 and 304, and immediately before the mold 300 is clamped together, mesh 26 is subjected to tensile forces such that the mesh 26 is substantially planar and not slack when the mold 300 is clamped together. In this respect, tension should be provided along the axis indicated by arrow 301. Where such tensile forces are absent, the mesh 26 may become convoluted and remain in this shape when the mold 300 is clamped together. This may result in a C-spacer 10 having a convoluted mesh portion 26, which makes it more difficult for the C-spacer 10 to form effective seals with adjacent structural components.

Referring to FIGS. 7, 8, 9, and 10, in one embodiment, the mold 300 is a three-plate mold comprising a sprue plate 306, a cavity plate 302, and a core plate 304. An injection mold machine 316 is provided to inject feed material through sprue 308 in sprue/runner plate 306. The sprue 308 comprises a throughbore which communicates with a runner system 310 (see FIG. 8) formed as an exterior surface 311 of cavity plate 302. The runners communicate with an interior of cavity 302 through a plurality of gates 314 (see FIG. 9) drilled through cavity plate 302.

When the individual plates 302, 304 and 306 of mold 300 are clamped together, feed material injected by injection mold machine 316 through sprue 308 flows through the runner system 310 and is directed via gates 314 into impressions 318 and 320. Once inside cavity plate 302, injected feed material fills the impressions 318 and 320 formed in the interior surfaces 322 and 324 of cavity plate 302 and core plate 304 respectively, such impressions being complementary to the features of C-spacer perimeter 12. In filling the impressions, feed material flows through mesh 26 which is clamped between core and cavity plates 302 and 304.

To help define inner peripheral edge 18 of C-spacer 10, a continuous ridge 326 depends from interior surface 322 of cavity plate 302 defining a space 328 wherein feed material is prevented from flowing into. Similarly, a complementary continuous ridge 330 depends from interior surface 324 of core plate 304, defining a space 332 wherein feed material is also prevented from flowing into space 328. To this end, when cavity plate 302 and core plate 304 are clamped together, ridges 326 and 330 pinch opposite sides of mesh 26, thereby creating a barrier to flow of injected feed material. In doing so, such arrangement facilitates the creation of inner peripheral edge 18 of C-spacer perimeter 12, to which mesh 26 is joined.

To injection mold the C-spacer embodiment illustrated in FIG. 2, the core and cavity plates 302 and 304 are clamped together, thereby pinching mesh 26 therebetween. Conventional injection mold machines can be used, such as a Sumitomo SH22OA™ injection mold machine. To begin injection molding, material used for manufacturing the C-spacer perimeter, such as a thermoplastic vulcanizate, is dropped from an overhead hopper into the barrel of the machine where it is plasticized by the rotating screw. The screw is driven backwards while the material itself remains out in front between the screw and the nozzle. Temperature along the material pathway varies from approximately 380° F. where the material enters the screw to 400° F. immediately upstream of the mold 300.

To begin filling the mold 300, screw rotation is stopped, and molten plastic is thrust forward in the direction of the screw axis through the nozzle 334, sprue 308 and mold gates. Once the mold 300 is filled, injection pressure is maintained to pack out the part. Material shrinkage occurs inside the mold 300 as the temperature is relatively lower than inside the barrel. As a result, pressure must be continuously applied to fill in any residual volume created by shrinkage. When the part is adequately packed and cooled, mold 300 is opened. The ejector pins 336 are actuated, thereby releasing the part.

FIGS. 11, 12, 13 and 14 illustrate a second mold 400 which could be used to form C-spacer 10 by overmolding mesh 26 with perimeter 12. Mesh 26 is first formed by conventional methods and then interposed between cavity plate 402 and core plate 404 of mold 400. In particular, mesh 26 is suspended on hanging pins 401 which depend from interior surface 422 of cavity plate 402. To this end, mesh 26 is provided with throughbores which receive hanging pins 401. In one embodiment, mesh 26 is die cut to dimensions such that mesh 26 does not extend appreciably into perimeter 12 once perimeter 12 is formed within impression 418 and 420 by injection molding using mold 400. In this respect, in another embodiment, mesh 26 does not extend across feature on the impressions 418 and 420 which cause the formation of the secondary seal member 34. Interior surface 424 of core plate 404 is provided with depressions 405 to receive and accommodate hanging pins 401 when mold 400 is clamped together.

Referring to FIGS. 11, 12, 13 and 14, in one embodiment, the mold 400 is a three-plate mold comprising a sprue plate 406, a cavity plate 402, and a core plate 404. An injection mold machine 416 is provided to inject feed material through sprue 408 in sprue plate 406. The sprue 408 comprises a throughbore which communicates with a runner system 410 (see FIG. 14) formed as an exterior surface 411 of cavity plate 402. The runners communicate with an interior of cavity 402 through a plurality of gates 414 (see FIG. 12) drilled through cavity plate 402.

When the individual plates 402, 404 and 406 of mold 400 are clamped together, feed material injected by injection mold machine 416 through sprue 408 flows through the runner system 410 and is directed via gates 414 into impressions 418 and 420. Once inside cavity plate 402, injected feed material fills the impressions 418 and 420 formed in the interior surfaces 422 and 424 of cavity plate 402 and core plate 404 respectively, such impressions being complementary to the features of C-spacer perimeter 12. In filling the impressions, feed material flows through the perimeter of mesh 26 which is clamped between core and cavity plates 402 and 404.

To help define inner peripheral edge 18 of C-spacer 10, a continuous ridge 426 depends from interior surface 422 of cavity plate 402 to abut a side of mesh 26 defining an interior space 428 wherein feed material is prevented from flowing thereinto. Similarly, a complementary continuous ridge 430 conterminous with continuous ridge 426 depends from interior surface 424 of core plate 404 to abut the opposite side of mesh 26, defining an interior space 432 wherein feed material is also prevented from flowing into space 432. To this end, when cavity plate 402 and core plate 404 are clamped together, opposed conterminous ridges 426 and 430 pinch opposite sides of mesh 26, thereby creating a barrier to flow of injected feed material. In doing so, such arrangement facilitates the creation of inner peripheral edge 18 of C-spacer perimeter 12, to which mesh 26 is joined.

Using mold 400, injection molding of the C-spacer embodiment illustrated in FIG. 2 can be accomplished much in the same manner as when using above-described mold 300.

It will be understood, of course, that modification can be made in the embodiments of the invention described herein without departing from the scope and purview of the invention as defined by the appended claims.

What is claimed is:

1. A method of injection molding a spacer comprising a perimeter defined by an outer peripheral edge and an inner peripheral edge and having a surface with a sealing member extending therefrom, wherein the inner peripheral edge defines a space disposed inwardly from the outer peripheral edge, and a mesh extending across the space and coupled to the inner peripheral edge, including the steps of (a) providing a mold having a cavity and a core, the cavity having a first interior surface and a first continuous ridge depending from the first interior surface, the core having a second interior surface and a second continuous ridge depending from the second interior surface and aligned with the first continuous ridge, wherein at least one of the first and second interior surfaces includes an impression configured to effect formation of the sealing member on the spacer; (b) positioning a mesh having opposite sides between the cavity and the core such that, when the core and the cavity are clamped together, the mesh does not interfere with the formation of the sealing member upon injection of plastic material into the mold; and (c) pinching opposite sides of the mesh between the ridges to form a flow barrier.

2. The method as claimed in claim 1 wherein the perimeter and the mesh are comprised of different materials.

3. The method as claimed in claim 2 wherein the perimeter is comprised of materials selected from the group consisting of thermoplastic vulcanizates, thermoplastic olefins, and fluoropolymers.

4. The method as claimed in claim 2 wherein the perimeter is comprised of a thermoplastic vulcanizate.

5. The method as claimed in claim 3 wherein the mesh is comprised of materials selected from the group consisting of polypropylene and polyethylene.

6. The method as claimed in claim 4 wherein the mesh is comprised of materials selected from the group consisting of polypropylene and polyethylene.

7. The method as claimed in claim 6 wherein the mesh is not slack.

8. The method as claimed in claim 1 wherein the cavity further includes hanging pins depending from the interior surface, and additionally comprising, in step (b), suspending the mesh from the hanging pins.

9. The method as claimed in claim 1 wherein the mesh is positioned such that, when the core and the cavity are clamped together, the mesh does not extend across the impressions.

10. The method as claimed in claim 9 wherein the perimeter and the mesh are comprised of different materials.

11. The method as claimed in claim 10 wherein the perimeter is comprised of materials selected from the group consisting of thermoplastic vulcanizates, thermoplastic olefins, and fluoropolymers.

12. The method as claimed in claim 10 wherein the perimeter is comprised of a thermoplastic vulcanizate.

13. The method as claimed in claim 11 wherein the mesh is comprised of materials selected from the group consisting of polypropylene and polyethylene.

14. The method as claimed in claim 12 wherein the mesh is comprised of materials selected from the group consisting of polypropylene and polyethylene.

15. The method as claimed in claim 14 wherein the mesh is not slack.

* * * * *